(12) United States Patent
Yang et al.

(10) Patent No.: US 6,742,650 B2
(45) Date of Patent: Jun. 1, 2004

(54) METAL HYDRIDE STORAGE CANISTER DESIGN AND ITS MANUFACTURE

(75) Inventors: Jefferson YS Yang, Orange, CA (US); Mike Kao, Anaheim, CA (US)

(73) Assignee: Asia Pacific Fuel Cell Technologies, Ltd., Taipei (TW)

(*) Notice: Subject to any disclaimer, the term of this patent is extended or adjusted under 35 U.S.C. 154(b) by 112 days.

(21) Appl. No.: 09/971,898

(22) Filed: Oct. 5, 2001

(65) Prior Publication Data

US 2003/0019765 A1 Jan. 30, 2003

(30) Foreign Application Priority Data

Jul. 24, 2001 (TW) .......................... 90118041

(51) Int. Cl.⁷ .............................. F17C 11/00
(52) U.S. Cl. ...................... 206/0.7; 206/499
(58) Field of Search ............. 206/0.6, 0.7, 499; 220/560.04, 565, 581

(56) References Cited

U.S. PATENT DOCUMENTS

| | | |
|---|---|---|
| 4,619,589 A | 10/1986 | Mueller et al. |
| 4,667,815 A * | 5/1987 | Halene .................. 206/0.7 |
| 4,824,340 A | 4/1989 | Bruggeman et al. |
| 4,966,528 A | 10/1990 | Henkel et al. |
| 5,246,351 A | 9/1993 | Horn et al. |
| 5,252,410 A | 10/1993 | Wilkinson et al. |
| 5,484,666 A | 1/1996 | Gibb et al. |
| 5,547,777 A | 8/1996 | Richards |
| 5,635,039 A | 6/1997 | Cisar et al. |
| 5,773,160 A | 6/1998 | Wilkinson et al. |
| 5,798,186 A | 8/1998 | Fletcher et al. |
| 5,840,438 A | 11/1998 | Johnson et al. |
| 6,132,449 A | 10/2000 | Lum et al. |
| 6,149,810 A | 11/2000 | Gonzalez-Martin et al. |
| 6,200,698 B1 | 3/2001 | Carlstrom |
| 6,265,093 B1 | 7/2001 | Surampudi et al. |
| 6,360,835 B1 | 3/2002 | Skala |
| 6,436,562 B1 | 8/2002 | DuBose |
| 6,447,945 B1 | 9/2002 | Streckert et al. |
| 6,464,846 B1 | 10/2002 | Titterington |
| 6,569,298 B2 | 5/2003 | Mérida-Donis |

FOREIGN PATENT DOCUMENTS

| | | |
|---|---|---|
| EP | 0 741 428 A1 | 4/1995 |
| JP | 03-113188 A | 5/1991 |
| JP | 08-045517 | 2/1996 |
| JP | 10-055813 | 2/1998 |
| JP | 11-154522 | 6/1999 |
| JP | 2000-133290 | 5/2000 |

OTHER PUBLICATIONS

Japanese Office Action for Patent Application No. 2002–38677, 3 pages, Sep. 17, 2002.

European Search Report for EP 02 01 4823 dated Feb. 13, 2003, 3 pages, European Patent Office.

* cited by examiner

Primary Examiner—Jacob K. Ackun
(74) Attorney, Agent, or Firm—Rosenberg, Klein & Lee

(57) ABSTRACT

This invention is related to a metal hydride storage canister, comprising a storage canister body, a wafer baffle stacked on the body for containing metal hydride of a pre-determined amount, and a tubing having a porous surface for securing the wafer baffle in the body and for guiding hydrogen discharged from the metal hydride to an outlet of the body. This invention further discloses the manufacture of the storage canister.

6 Claims, 3 Drawing Sheets

METAL HYDRIDE STORAGE CANISTER DESIGN AND ITS MANUFACTURE

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention is related to a metal hydride storage canister, particularly a canister for use with a hydrogen fuel cell. The canister enhances thermal conductivity and provides space required by the expansion of the metal hydride. This invention further discloses the manufacture of the storage canister.

2. Description of the Related Art

With the rapid growth of human civilization the consumption of traditional energy sources, such as coal, oil and natural gas, increases rapidly. This results in serious pollution to the global environment and causes various environmental problems such as global warming and acid rain. It is now recognized that the existing natural energy resources are limited. Therefore, if the present rate of energy consumption continues, all existing natural energy sources will be exhausted in the near future. Accordingly, many developed countries are dedicated to the research and development of new and alternative energy sources. The fuel cell is one of the most important and reasonably priced energy sources. Compared with traditional internal combustion engines, the fuel cell has many advantages such as high-energy conversion efficiency, clean exhaust, low noise, and no consumption of traditional gasoline.

In brief, a fuel cell is an electrical power generation device powered by the electrochemical reaction of hydrogen and oxygen. Basically, the reaction is a reverse reaction of the electrolysis of water, which converts the chemical energy into electrical energy. The basic structure of a fuel cell, for example, a proton exchange membrane fuel cell, comprising a plurality of cell units. Each cell unit contains a proton exchange membrane (PEM) at the middle, with the two sides thereof provided with a layer of catalyst. Each of the two outsides of the catalyst is further provided with a gas diffusion layer (GDL). An anode plate and a cathode plate are further provided at the outermost sides adjacent to the GDL. After all of the above elements are combined together, a cell unit is formed.

For the practical application of a fuel cell, a plurality of the above cell units are stacked and serially connected to form a cell stack for providing sufficient power, The cell stack is positioned between two end plates provided at the longitudinal, opposing ends of the cell stack. A plurality of tie rods pass through a peripheral region of each end plate for positioning the cell stack between the two end plates.

While performing the aforesaid reverse reaction of the electrolysis of water, in order to convert the chemical energy into electrical energy, the cell stack must be maintained under a consistent pressure range. This ensures that the reverse reaction of the electrolysis of water is performed under the optimum pressure condition to enhance the conversion efficiency of the chemical energy into electrical energy.

One known measure of storing hydrogen is to use the so-called metal hydride. Metal hydride is able to discharge hydrogen at a pressure corresponding to the temperature that it experiences; the process of releasing hydrogen is an endothermic reaction. When the hydrogen stored within the metal hydride has been completely exhausted, pure hydrogen can be re-charged back to the metal hydride; the process of charging hydrogen is an exothermic reaction. The temperature that metal hydride experiences is positively proportional to the pressure of the hydrogen to be discharged from the metal hydride. Such a proportional relationship may vary among metal hydrides furnished by different suppliers.

Due to the highly combustive characteristic of hydrogen, an easy and convenient method for pre-storing hydrogen within a specific container, and for releasing hydrogen as required for performing the above reverse reaction, is needed. The commonly known storage container is mostly a metal container capable of sustaining a pre-determined pressure and temperature. The container is sealed after a pre-determined amount of metal hydride is loaded therein.

Since the volume of metal hydride increases 5 to 20% after being charged with hydrogen, excessive space must be reserved when loading the metal hydride into the container to provide the space required by expansion of the metal hydride. Expansion of the metal hydride will easily cause compaction of the metal hydride when it is placed within a mutual space in conventional containers. The exothermic reaction during the process of charging hydrogen may cause an increment in temperature thereby, reducing the rate of charging hydrogen, such that the process must rely on the container surface to release the thermal energy to reduce the temperature. On the contrary, the endothermic reaction during the process of discharging hydrogen also relies on the container surface to absorb heat to efficiently increase rate of heat transfer. The mechanism for enhancing the rate of heat transfer is essential because metal hydride has a relatively low thermal conductivity. Furthermore, an easy passageway is needed for guiding the hydrogen discharged from the metal hydride to an outlet of the container.

It should also be noted that aside from fuel cells, the metal hydride storage canister according to this invention could also be adapted in other applications, such as hydrogen driven pumps, and hydrogen driven air-conditioners.

BRIEF SUMMARY OF THE INVENTION

It is a primary objective of this invention to overcome the defects of conventional containers:

- to provide a storage canister capable of enhancing thermal conductivity
- to reduce compactness among the metal hydride
- to prevent cracks found in the metal hydride stack
- to provide an easy passageway for guiding the hydrogen discharged from the metal hydride to an outlet of the canister This will effectively enhance the operative efficiency of the fuel cell.

The major technical content of this invention mainly uses a wafer baffle made of a thermally conductive material placed in a storage canister for containing metal hydride, and a plurality of porous tubings for securing the wafer baffle in the storage canister as well as for guiding hydrogen discharged from the metal hydride to an outlet of the storage canister. This invention further discloses the manufacture of the storage canister.

The structures and characteristics of this invention can be realized by referring to the appended drawings and explanations of the preferred embodiments.

DETAILED DESCRIPTION OF THE INVENTION

Figure 1:
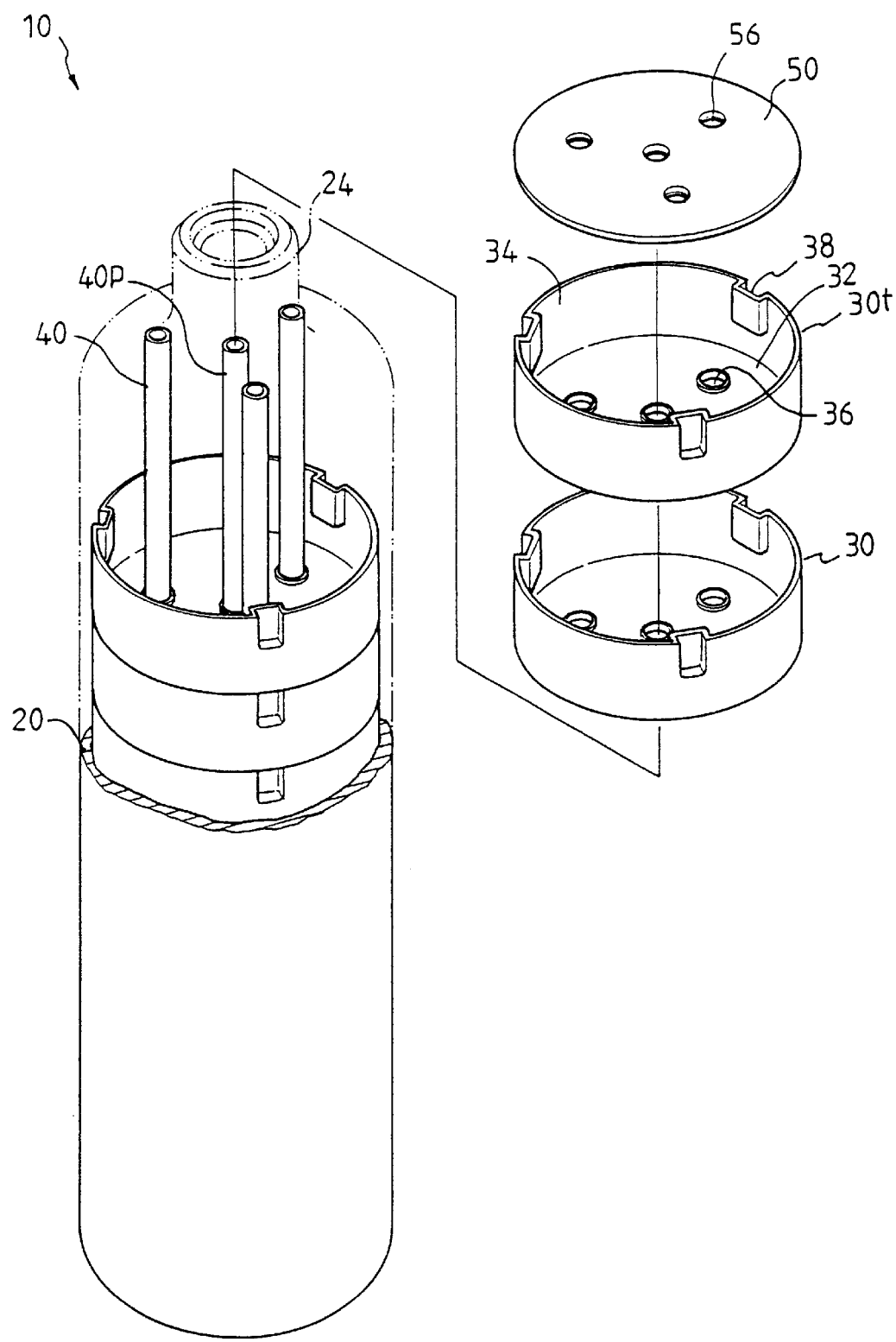
FIG. 1 is an exploded, perspective view of a metal hydride storage canister according to this invention.

As illustrated in FIG. 1, the metal hydride storage canister 10 comprises: a storage canister body 20; a plurality of wafer baffles 30; a plurality of tubings 40; and a lid 50.

Figure 4:
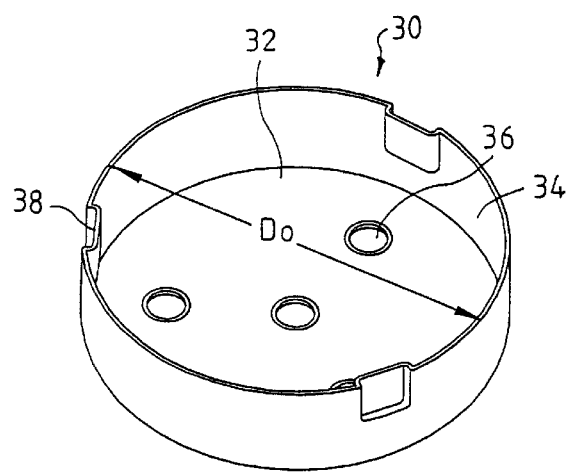
FIG. 4 is a cross-sectional view of a canister body.

With reference to FIG. 4, the canister body 20 has an inner diameter Di, a bottom 22, and an outlet 24 opposing the bottom 22.

Figure 3:
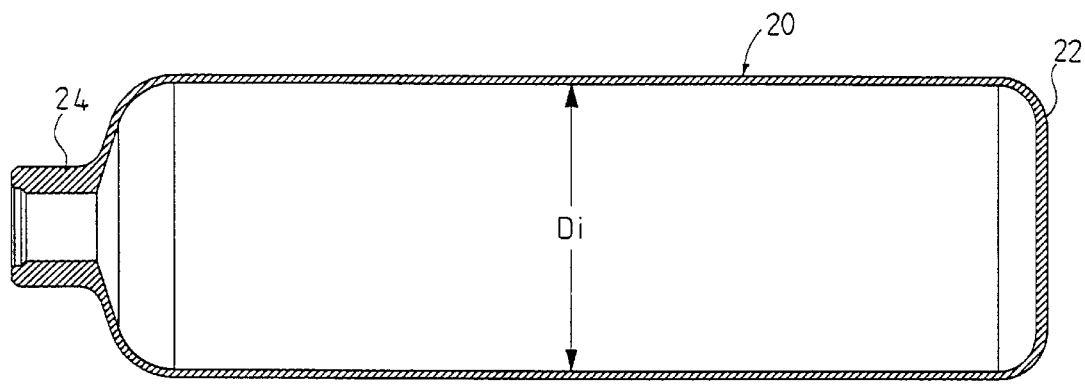
FIG. 3 is a perspective view of a wafer baffle.

With reference to FIG. 3, the wafer baffles 30 are stacked in the canister body 20 for containing a pre-determined amount of metal hydride. Each wafer baffle 30 is made of a thermally conductive material and has a bottom face 32 and a peripheral wall 34 with an outer diameter Do, the peripheral wall substantially extending from a periphery of the bottom face 32 orthogonally. Each bottom face 32 of the wafer baffle 30 is formed with a plurality of apertures 36. As illustrated in FIG. 3, the peripheral wall 34 of each wafer baffle 30 has an upper edge that is formed with at least one notch 38 for enhancing the support strength of the wafer baffle 30, and for preventing another wafer baffle 30 stacking over the present wafer baffle 30 from falling into the present wafer baffle 30. The outer diameter Do of the peripheral wall 34 is substantially equal to the inner diameter Di of the canister body 20.

The lid 50 is formed with a plurality of openings 56 at locations corresponding to where the apertures 36 of the bottom face 32 of each wafer baffle 30 are formed, and is stacked over a topmost wafer baffle 30t for keeping the metal hydride contained in the wafer baffle 30t within its desired location. The lid 50 is preferably a porous metal sintered lid made by sintering processes.

The tubings 40 in term pass through the openings 56 of the lid 50 and the apertures 36 formed on the bottom face 32 of the wafer baffles 30, for securing the wafer baffles 30 and the lid 50 in the canister body 20. At least one 40p of the tubings has a porous surface for guiding the hydrogen discharged from the metal hydride to the outlet 24 of the container body 20. The porous tubing 40p can be made of any material that can sustain high temperature and high pressure. Preferably, the porous tubing 40p is a porous metal sintered tubing made by sintering processes.

To facilitate the manufacturing of the metal hydride storage canister 10 of this invention, the canister body 20 is a preformed body having a substantially cylindrical configuration prior to forming. The preformed body is formed with an open end where the outlet 24 is located upon forming of the canister body. The preformed body has an inner diameter that is slightly greater than the outer diameter Do of the peripheral walls 34 of the wafer baffles 30.

While manufacturing the metal hydride storage canister 10, metal hydride that has yet to be charged with hydrogen is placed in each of the wafer baffles 30. Space should be reserved in each of the wafer baffles 30 to provide the space required by expansion of the metal hydride upon charging of hydrogen.

The wafer baffles 30 are then stacked over one another in such a manner that the corresponding apertures 36 at the bottom faces 32 of the wafer baffles 30 align with one another. If the material selected to make the wafer baffles 30 is of insufficient strength, the notches 38 formed at the upper edge of the peripheral wall 34 of each wafer baffle 30 are adapted to enhance its supportive strength to prevent another wafer baffle stacking over a lower wafer baffle from falling into the lower wafer baffle. The lid 50 is then stacked over the topmost wafer baffle 30t.

The tubings 40, 40p then pass through the openings 56 of the lid 50 and the apertures 36 formed on the bottom faces 32 of the wafer baffles 30 to prevent relative movement of the wafer baffles 30.

Figure 2:
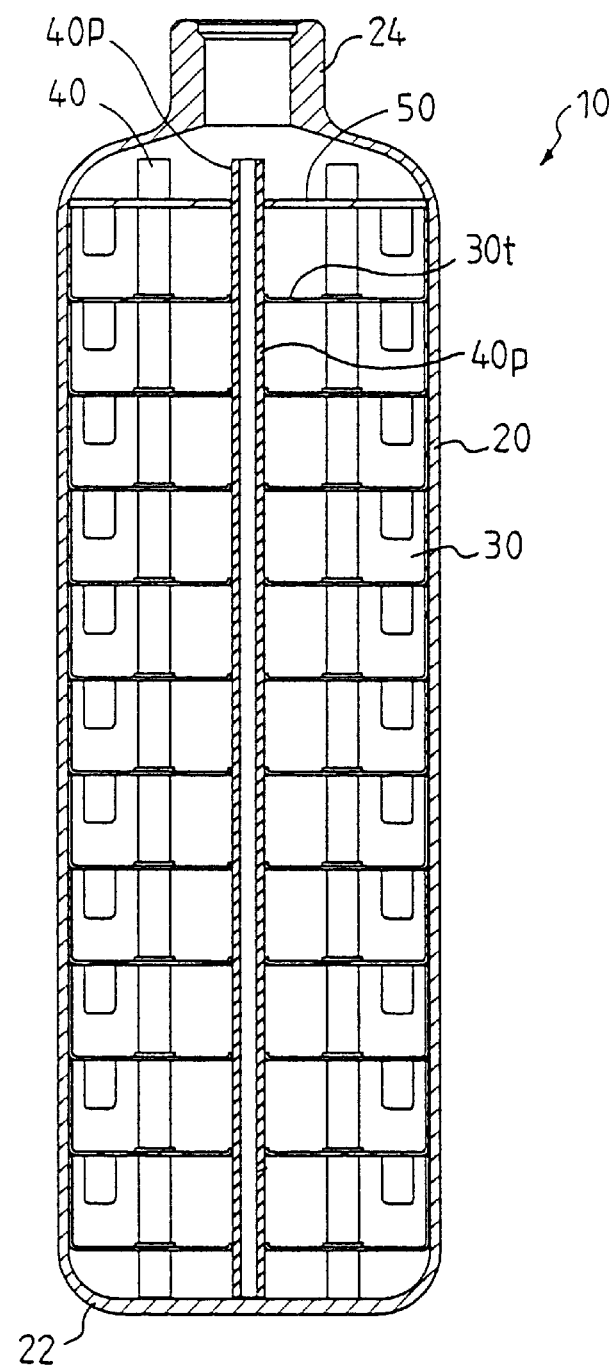
FIG. 2 is a cross-sectional view illustrating the metal hydride storage canister of FIG. 1.

At this time, the stacked and secured wafer baffles 30 and lid 60 may be placed into the preformed body of the canister body 20 through the opening of the preformed body. The preformed body and its opening are then shrunk to the configuration of FIG. 2 through heat rolling.

Prior to using the metal hydride storage canister 10, fresh, pure hydrogen is guided to each wafer baffle 30 by the porous tubing 40p through the outlet 24 of the canister body 20, and thus charged to the metal hydride contained in each wafer baffle 30. When the hydrogen stored within the metal hydride has been completely exhausted, pure hydrogen can be re-charged back to the metal hydride in a similar manner.

Since the peripheral walls 34 of the wafer baffles 30 are in close contact with the canister body, and because the wafer baffles 30 are made of a thermally conductive material, it is ensured that thermal energy being applied to the canister is evenly distributed and applied to the metal hydride contained in the wafer baffles 30, thereby enhancing the rate of heat transfer, providing space for the even expansion of the metal hydride, and allowing the metal hydride stack to completely discharge the hydrogen charged therein. The porous tubing 40p of this invention further serves as an easy passageway for guiding the hydrogen discharged from the metal hydride to the outlet 24 of the container body 20, so as to effectively enhance the operative efficiency of the fuel cell.

This invention is related to a novel creation that makes a breakthrough to conventional art. Aforementioned explanations, however, are directed to the description of preferred embodiments according to this invention. Various changes and implementations can be made by those skilled in the art without departing from the technical concept of this invention. Since this invention is not limited to the specific details described in connection with the preferred embodiments, changes to certain features of the preferred embodiments without altering the overall basic function of the invention are contemplated within the scope of the appended claims.

What is claimed is:

1. A metal hydride storage canister, comprising:
    a storage canister body having a predetermined inner diameter, the canister body having a bottom formed on one end thereof and an outlet formed on an opposing end;
    a plurality of wafer baffles disposed in stacked relationship in the canister body, each of the wafer baffles being made of a thermally conductive material, each wafer baffle having a bottom face formed with at least one aperture therein, a peripheral wall with an outer diameter substantially equal to the predetermined inner diameter of the canister body, and an open upper end, the peripheral wall extending substantially orthogonally from a periphery of the bottom face and having a plurality of depressions formed therein adjacent the open upper end for preventing nesting of the stacked wafer baffles;

a lid overlaying an uppermost one of the plurality of wafer baffles, the lid having at least one aperture formed therein in aligned relationship with the at least one aperture of the plurality of wafer baffles; and, a first tubing passing through the at least one aperture of the bottom face of the plurality of wafer baffles and the at least one aperture of the lid, the first tubing having a porous body and being in fluid communication with the outlet of the canister body.

2. The metal hydride storage canister according to claim 1, wherein the lid is formed of a porous material.

3. The metal hydride storage canister according to claim 2, wherein the porous material of the lid is a porous sintered metal composition.

4. The metal hydride storage canister according to claim 1, wherein the body of the first tubing is formed of a porous sintered metal composition.

5. The metal hydride storage canister according to claim 1, further comprising at least one second tubing, passing through corresponding second apertures in each of the plurality of wafer baffles and the lid, the at least one second tubing having a porous body and being in fluid communication with the outlet of the canister body.

6. The metal hydride storage canister according to claim 5, wherein the body of the second tubing is formed of a porous sintered metal composition.

* * * * *